United States Patent [19]

Pitts

[11] Patent Number: 4,896,519

[45] Date of Patent: Jan. 30, 1990

[54] SURFBOARD LOCKING APPARATUS AND METHOD

[76] Inventor: Steven K. Pitts, 1508 Cameo Dr., San jose, Calif. 95129

[21] Appl. No.: 350,858

[22] Filed: May 12, 1989

[51] Int. Cl.⁴ .............................................. E05B 73/00
[52] U.S. Cl. ............................................ 70/58; 70/18
[58] Field of Search ........................ 70/58, 57, 14, 18; 441/74; 224/309, 315

[56] References Cited

U.S. PATENT DOCUMENTS

| | | | |
|---|---|---|---|
| 1,601,493 | 9/1926 | Condon | 70/58 |
| 3,339,607 | 9/1967 | Howard | 224/309 |
| 3,590,608 | 7/1971 | Smyth . | |
| 3,754,420 | 8/1973 | Oellerich . | |
| 3,905,214 | 9/1975 | Bell . | |
| 3,959,995 | 6/1976 | Fletcher . | |
| 3,999,409 | 12/1976 | Bell . | |
| 4,216,665 | 8/1980 | McKelvey | 70/58 |
| 4,289,260 | 9/1981 | Zoor | 224/315 |
| 4,340,376 | 7/1982 | Williams . | |
| 4,366,605 | 1/1983 | McKenney | 224/315 |
| 4,409,260 | 9/1984 | Delahanty | 224/315 |
| 4,516,709 | 5/1985 | Bott | 224/315 |
| 4,680,949 | 7/1987 | Stewart | 70/14 |
| 4,712,394 | 12/1987 | Bull . | |
| 4,765,521 | 8/1988 | Finnegan | 224/315 |

Primary Examiner—Robert L. Wolfe

[57] ABSTRACT

A locking apparatus having a padded U-shaped metal band sized for attachment encompassing a rear section of a surfboard anterior to a rear fin. An elongated cable, preferably metal, having looped terminal ends is provided. A padlock secures two ends of the U-shaped metal band together and one looped terminal end of the cable to the U-shaped metal band. The other end of the metal cable can be attached to an anchorage, positioned inside a locked door of a vehicle, or attached to any permanent fixture where locking is feasible. The method for locking the surfboard to a vehicle or to an anchorage includes steps to encase the surfboard locked in the locking apparatus and attached by cable closed in the locked door of a vehicle or attached to an anchorage.

14 Claims, 3 Drawing Sheets

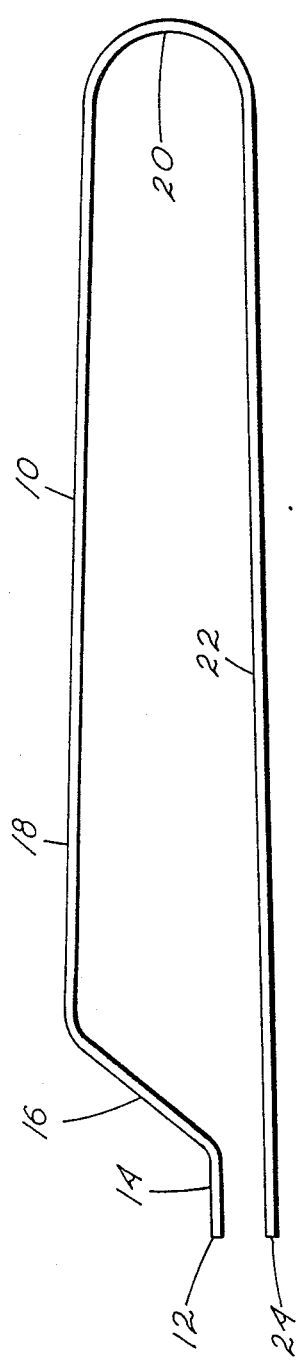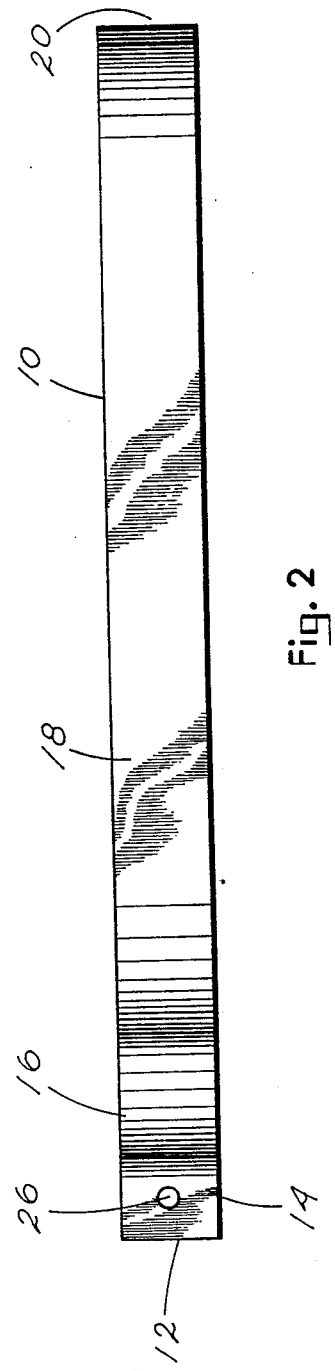

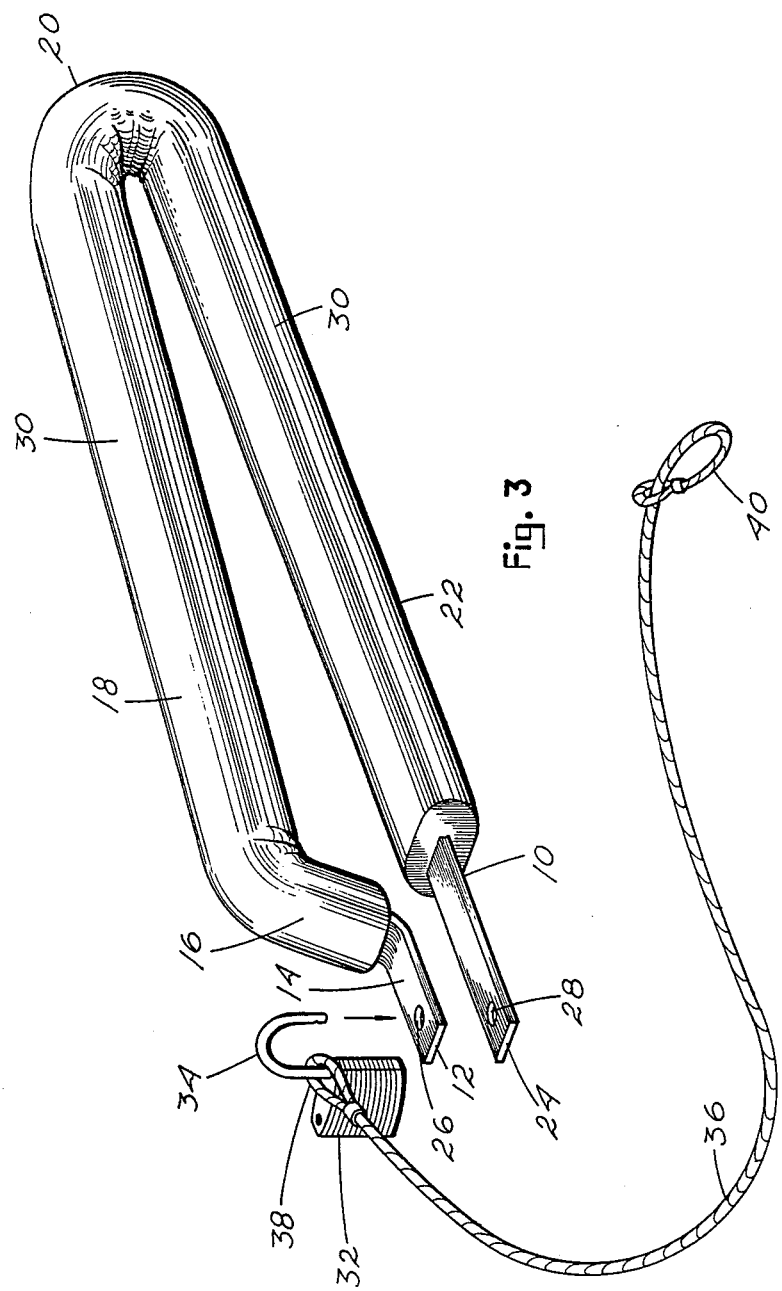

SURFBOARD LOCKING APPARATUS AND METHOD

BACKGROUND OF THE INVENTION

1. Field of the Invention

This invention relates to locking devices for securing surfboards and sailboards to a stable object. My device is comprised of a one-piece U-shaped padded metal band secured by a padlock and tethered by a metal cable. The unique method of securing the end of the metal cable within a locked car door makes this invention particularly useful for preventing the theft of the surfboard when it is attached to a car top luggage rack.

2. Description of the Prior Art

While the popularity of surfing has increased over the years so has the incidence of theft. Due to the large size of the surfboards and sailboards they are often transported on the exterior of vehicles or left outside public establishments where they are generally not protected from being stolen. This growing problem has created the need for development of a convenient and effective surfboard locking device. A past art patent search was conducted to examine locking devices for surfboards and the like, the majority of which were found in the following classes and subclasses:

70/58, 59, 18, 280/818, 248/503, 441/74, and 75.

Those past art patents found to be most relevant to my invention include the following:

Two past art devices were found specifically directed for use on surfboards; the Bull device, U.S. Pat. No. 4,712,394, issued on Dec. 15, 1987, and the Williams invention, dated July 20, 1982, U.S. Pat. No. 4,340,376. Both devices show locking methods which include permanently altering the integrity of the surfboard by drilling through the main body or fin. Permanent attachment of the locking means, or portions thereof, must be incorporated into the drilled area for proper functioning of both inventions. The most common composition of surfboards includes a foam core covered by a layer of impervious plastic or resin compound. By disrupting the outer impervious layer by drilling, access is made to the interior by the salt water, which could result in deterioration of the foam core. Although the Bull patent provides a sealing means, the chance for leakage is still present. The Williams lock, on the other hand, is permanently attached to a fin, which although it is not integrated with the inner core, changes the hydrodynamic functioning of the surfboard. Both past art devices are not only invasive and destructive to the structure of the surfboard but require time, accessory tools and a measure of skill to apply.

The remaining past art patents show devices for locking snow or water skis. Bell was granted two patents on very similar devices, the first issued on Sept. 16, 1975, U.S. Pat. No. 3,905,214, and the second on Dec. 28, 1976, U.S. Pat. No. 3,999,409. Both devices are comprised of a pair of ski encompassing jaws pivotally connected at one end and lockable at the other. Both have inherent combination locks, connecting chains or tethers for connection to a stable fixture, and interior protective felt lining to prevent damage to the finish of the skis. Both devices are specifically structured for use on skis and would require significant modifications for use on surfboards. They are also complex in design and would undoubtedly be expensive to manufacture.

The patent issued to Fletcher on June 1, 1976, U.S. Pat. No. 3,959,995, and the patent granted to Oellerich on Aug. 28, 1973, U.S. Pat. No. 3,754,420, show locking devices formed into rectangular metal structures designed to surround a pair of skis. The Fletcher device is comprised of several hinged metal plates while the Oellerich lock is made up of one rigid U-shaped member with a transverse locking bar. No means are provided by either device for protection of the skis from the edges of the metal plates.

The Smyth device U.S. Pat. No. 3,590,608, issued on July 6, 1971, shows a ski lock comprised of a flexible elongated cable having two forms of locking means.

Several disadvantages of the past art are obvious, especially with the Bull and Williams devices where the surfboard must be physically altered to utilize the locking mechanisms. The Bell devices are complex and costly to manufacture and are made-up of separate interlocking hinged sections. Should the inherent combination locks of the Bell devices become defective the entire device would prove useless. Both the Oellerich and the Fletcher devices provide no protective padding or covering to prevent damage to the skis. I feel my invention provides benefits not found in the previously mentioned past art devices and is therefore a new and useful invention for use in securing surfboards. These benefits are set forth in the following specification.

SUMMARY OF THE INVENTION

The present invention is a surfboard locking device for use in protecting surfboards and sailboards against theft. The locking device is comprised of a padded U-shaped metal band attached to an elongated metal cable by a padlock. The U-shaped metal band is a thin elongated rectangular band which is folded in half and has two terminal ends, one of which angles inwardly to be positioned parallel to the other terminal end. Each terminal end has an aperture sized for the insertion of the shackle of a padlock. The remainder of the metal band, save for the apertured terminal ends, is covered with a protective foam padding which prevents damage to the surfboard finish, and helps to provide a snug fit. In use, the apertured terminal ends are manually separated sufficiently to allow transverse passage over the surfboard. The metal band is sufficiently flexible to allow a certain degree of deformation with a return to its former shape. The newer models of surfboards come equipped with a set of three fins affixed to the bottom endward surface which provide an excellent site for the application of my locking device. The padded metal band is positioned between the single rear fin and the two forward fins of the surfboard which prevent the locking device from being removed forward or off the back end without first removing the padlock or the fins. Older model surfboards having single fins can still be utilized with my device since the padded metal band cannot be removed off the tail of the surfboard due to the tail fin, and it cannot be removed over the forward body section since the mid body of the surfboard is substantially wider than the length of the padded metal band. A metal cable having both terminal ends formed into permanent loops, is connected by one looped end to the padlock before the padlock is connected to the apertured terminal ends of the metal band. The surfboard is then affixed to the roof of a vehicle with some form of releasable ties or placed in the bed of a pick-up truck, and the free end of the cable passed through the open door of the vehicle. When the door is closed and locked, the cable is secured inside the car by the loop on the terminal end. As an alternative option, the free end of the cable can also be secured to a car top luggage rack or secured to the bed of the pick-up truck prior to attachment to the padlock. The cable can also be attached to an anchorage when security for the surfboard is required other than during transporting.

Therefore, it is a primary object of the invention to provide a surfboard locking device which prevents or deters the theft of the surfboard from a vehicle or other fixed object.

Another object of the invention is to provide a surfboard locking device which is simple in design and inexpensive to manufacture. The device is comprised mostly of ready-made off-the-shelf items which require only minor adaptation and assembly, avoiding the expense of plastic injection molding or metal die cast parts.

A further object of the invention is to provide a surfboard locking device which does not require the alteration or adaptation of the surfboard in any manner prior to usage of the device.

An even further object of the invention is to provide a surfboard locking device which can be used with surfboards having one or more fins.

A further object of the invention is to provide a surfboard locking device having a protective padded covering which prevents damage to the finish of the surfboard. The resiliency of the protective foam padding also allows for minor adjustability of the locking device for various thicknesses of surfboards.

Other objects and advantages of my invention will become apparent with a reading of the following specification and comparing numbered parts described with similarly numbered parts illustrated in the drawings.

BRIEF DESCRIPTION OF THE DRAWINGS

FIG. 1 is a side view of the U-shaped metal band without the protective padding.

FIG. 2 is a top view thereof.

FIG. 3 is a perspective view of the three basic components of the invention; the padded U-shaped metal band; the padlock, and the metal cable.

DESCRIPTION OF THE PREFERRED EMBODIMENT

Figure 4:
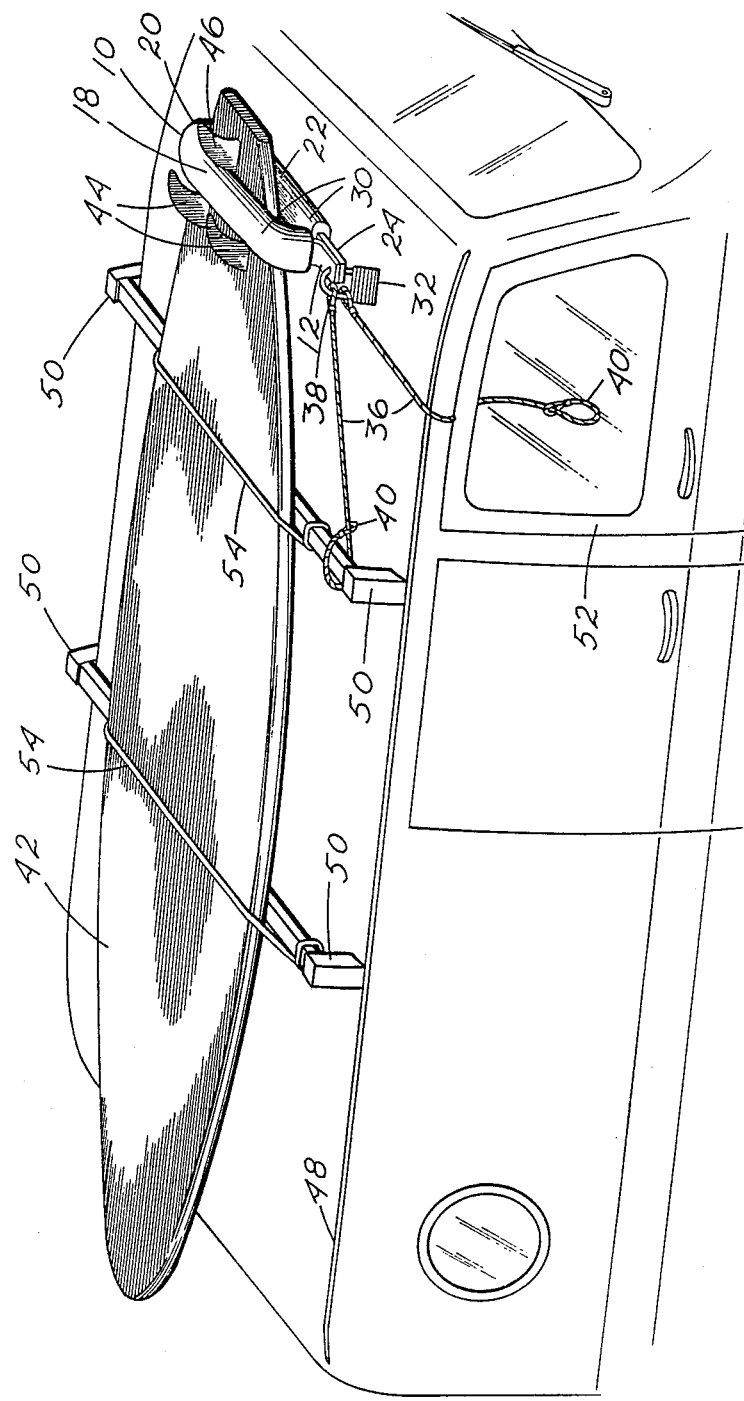
FIG. 4 is a perspective in-use view illustrating a surfboard secured to the roof of a vehicle with the locking device attached. Two metal cables are shown attached to the padlock to demonstrate attachment to the luggage rack and also the car door. The surfboard is tied to the luggage rack with sections of elastic cords.

Referring to the drawings and to FIG. 1 where the U-shaped metal band 10 is illustrated in a side view. U-shaped metal band 10 is an elongated thin rectangular metal strip transversely curved centrally at central U-bend section 20. U-shaped metal band 10 is arranged for vertical positioning with the U legs horizontally disposed, one above the other. The upper U leg has a first terminal end 12 at the end of a short horizontal top end section 14. Short horizontal top end section 14 first forms into upwardly angled section 16 then straightens out into top horizontal section 18. Top horizontal section 18 continues formed into central U-bend section 20 which continues formed into bottom horizontal section 22, the lower leg of the U, ending at second terminal end 24. Adjacent first terminal end 12 through short horizontal top end section 14 is upper lock shackle aperture 26 and adjacent second terminal end 24 through bottom horizontal section 22 is lower lock shackle aperture 28. FIG. 1 and FIG. 2 show a side view and a top plan view of U-shaped metal band 10 respectively which is the basic structure f the immediate invention.

In FIG. 3, the basic structure, U-shaped metal band 10, is illustrated encased in padded cover 30. Although U-shaped metal band 10 would work efficiently as a locking device as illustrated without covering, padded cover 30 enhances firmness in the fit of the locking structure to surfboard 42 and protects the surface of surfboard 42 and the finish of vehicle 48 from damage by rubbing. For locking first terminal end 12 down on second terminal end 24, padlock shackle 34 is passed down through upper lock shackle aperture 26 and through lower lock shackle aperture 28 and padlock 32 is locked. Before inserting padlock shackle 34 and locking padlock 32, shackle loop 38 at one end of cable 36 is passed over padlock shackle 34. Cable 36 is a short length of cable, preferably of cut resistant metal, having two looped terminal ends, a fixed loop, shackle loop 38, in one end and an adjustable loop, slip loop 40, in the opposite end. The fixed loop, shackle loop 38, is the padlocking end of cable 36 and slip loop 40 is the end useful for attachment to vehicular structure or an anchorage to prevent theft of surfboard 42, or a sailboard so attached. Of extreme importance in the secure locking of surfboard 42 to a vehicle 48, see illustration FIG. 4, is that U-shaped metal band 10, with or without padded cover 30, has top horizontal section 18 passing between the dual fins 44 and the end single fin 46 of inverted surfboard 42 with bottom horizontal section 22 passing along the upper surface side, now downward, of surfboard 42.

The method for locking a surfboard 42 to the top of a vehicle 48 is as follows. Surfboard 42 is positioned inverted on top of carrier racks 50 located on the top of vehicle 48. Elastic cords 54 are fastened across the bottom of surfboard 42 as illustrated in FIG. 4. U-shaped metal band 10 with padded cover 30 installed is physically pulled open separating first terminal end 12 and second terminal end 24 sufficiently to slide U-shaped metal band 10 over and around the rear end of surfboard 42. Top horizontal section 18 is passed between dual fins 44 and single fin 46. Padlock shackle 34 is passed through shackle loop 38 of cable 36 and next through upper lock shackle aperture 26. The terminal ends 12 and 24 are pressed towards each other and padlock shackle 34 is then passed through lower lock shackle aperture 28 and padlock 32 is snapped shut and locked. Cable 36 is then shut in vehicle door 52 with the slip loop 40 end inside the cab. When vehicle door 52 is locked shut surfboard 42 is secured. An alternate method of attaching the slip loop 40 end of cable 36 is to carrier rack 50 as illustrated in FIG. 4. However passing the end of cable 36 through the edge of vehicle door 52 and locking the door, is considered most efficient. To form a larger end at slip loop 40 and make pulling cable 36 through the car door crack, shackle loop 38 can be passed through slip loop 40 prior to locking terminal ends 12 and 24 together and a large looping knot can be formed at slip loop 40 end. The immediate invention is applicable as a locking device for both surfboards and sailboards carried on the tops of cars or in the beds of pick up trucks. The slip loop 40 end of cable 36 can be fastened by locking a door or by attachment to any available permanent fixture on a vehicle. The slip loop 40 end can also be attached to an anchorage such as an implanted bicycle rack or a roof post for securing surfboard 42 away from a vehicle.

Padded cover 30 prevents the locking device from sliding around creating noise and possible damage to surfboard 42 or vehicle 48 during vehicular transporting. The closed celled foam plastic, of which protective padded cover 30 is comprised, is also buoyant and will support the locking device in the water. This may prove valuable when using the invention to secure surfboard 42 or sailboards to boats or docks which are on water.

Although padlock 32 is shown as a key locking device, other suitable locks can be used as long as padlock shackle 34 is of sufficient length and size. Cable 36 can also be substituted for chain or a spring coiled cable. A protective coating should be applied to any chain or other tether which could damage the finish on surfboard 42 or vehicle 48. Although metal band 10 is shown having an upwardly angled section 16 on only one horizontal section, top horizontal section 18, both the top and bottom horizontal sections 18 and 22 could be angled if desired, as this is only a design choice and has no bearing on the functioning of the invention. Also both horizontal sections 18 and 22 could be straight and a padlock 32 with an extra long padlock shackle 34 could be used.

The specific descriptions and illustrations given for this device in the specification are not intended to limit the scope of the invention. Therefore, it is to be understood that future modifications in design and structure of the invention may be practiced so long as changes made remain within the intended scope of the appended claims.

What I claim as my invention is:

1. A method for securing a surfboard to a vehicle with a surfboard locking apparatus utilizing a U-shaped band with cable and releasable locking means, said method comprising:
    (a) inverting and affixing said surfboard horizontally to a carrier on said vehicle adjacent any openable and lockable doors accessing said vehicle;
    (b) placing said U-shaped band transversely over a rear section of said inverted surfboard with an upper leg of said U in front of a rear fin on said inverted surfboard and a lower leg of said U along a downwardly faced side of said inverted surfboard;
    (c) attaching said upper leg and said lower leg of said U together at an open end using apertures in said legs and affixing therethrough said releasable locking means simultaneously attaching a looped end of a length of at least one said cable to said U-shaped locking apparatus by said releasable locking means; said length of cable used having looped terminal ends;
    (d) inserting a free said terminal looped end of said length of said cable inside of said vehicle along the edge of one of said doors opened;
    (e) closing and locking said doors with said length of said cable wedged in said edge of said one of said doors and any windows therein up in closed position.

2. The method of claim 1 wherein said carrier includes a car top carrier.

3. The method of claim 1 wherein said carrier includes a truck bed.

4. The method of claim 1 wherein said releasable locking means includes using a padlock.

5. A surfboard locking apparatus for securing a surfboard to a vehicle, comprising;
    (a) a U-shaped band having legs of said U substantially parallel each said leg apertured adjacent terminal ends;
    (b) said U-shaped band adapted to releasably encompass transversely a rear section of said surfboard anterior to a rear fin on said surfboard with said apertures and said terminal ends aligned clear of said surfboard;
    (c) at least one length of elongated cable having looped terminal ends;
    (d) means for releasable locking one of said looped terminal ends of said cable and said terminal ends of said U-shaped band together utilizing said apertures;
    (e) means for protecting outer finishes of said surfboard and said vehicle.

6. The surfboard locking apparatus of claim 5 wherein said means for protecting finish of said surfboard and said vehicle includes protective foam padding affixed over said U-shaped band leaving a portion of said terminal ends exposed.

7. The surfboard locking apparatus of claim 5 wherein said locking means includes a padlock.

8. The surfboard locking apparatus of claim 5 wherein said cable has an exterior layer of protective covering.

9. A method for securing a surfboard to an anchorage with a surfboard locking apparatus utilizing a U-shaped band with cable and releasable locking means, said method comprising:
    (a) placing said U-shaped band transversely over a rear section of said surfboard with one leg of said U in front of a rear fin on said surfboard and one leg of said U crossing an opposite side of said surfboard and said legs at an open end of said U terminating with short leg ends in parallel alignment clear of said surfboard;
    (b) affixing said cable, a length thereof having looped terminal ends, to said anchorage in a manner requiring unlocking said releasable locking means to free said cable from said anchorage;
    (c) closing said open end of said U by attaching said legs of said U, said short leg ends clear of said surfboard, together entrapping said surfboard by utilizing apertures in said legs to apply said releasable locking means and simultaneously attaching at least one said looped end of said length of said cable to said U-shaped band by said releasable locking means.

10. The method of claim 9 wherein said releasable locking means includes using a padlock.

11. A surfboard locking apparatus for securing a surfboard to an anchorage, comprising;
    (a) a U-shaped band having each leg of said U apertured adjacent terminal ends at an open end of said U with said legs substantially parallel and said apertures aligned;
    (b) said U-shaped band adapted to releasably encompass transversely a rear section of said surfboard anterior to a rear fin on said surfboard with said leg terminal ends and said apertures in alignment clear of said surfboard;
    (c) at least one length of elongated cable having looped terminal ends;
    (d) means for releasable locking at least one of said looped terminal ends of said cable and both said terminal ends of said U-shaped band together utilizing said apertures.

12. The surfboard locking apparatus of claim 11 wherein said means for releasable locking includes a padlock.

13. The surfboard locking apparatus of claim 11 wherein said cable has an exterior layer of protective covering.

14. The surfboard locking apparatus of claim 11 wherein said cable is a chain.

* * * * *